United States Patent [19]

Miller

[11] Patent Number: 5,188,446

[45] Date of Patent: Feb. 23, 1993

[54] CIRCUIT ASSEMBLY FOR ILLUMINATED VISOR

[75] Inventor: Douglas C. Miller, Hersey, Mich.

[73] Assignee: Plasta Fiber Industries Corp., Marlette, Mich.

[21] Appl. No.: 743,107

[22] Filed: Aug. 9, 1991

[51] Int. Cl.$^5$ .............................................. B60R 1/12
[52] U.S. Cl. .................... 362/83.1; 362/144; 296/97.5
[58] Field of Search ............... 362/61, 80, 74, 80.1, 362/83.1, 142, 143, 144; 296/97.5; 200/61.72

[56] References Cited

U.S. PATENT DOCUMENTS

| | | | |
|---|---|---|---|
| 4,213,169 | 7/1980 | Kempkers | 362/74 |
| 4,648,011 | 3/1987 | Boote et al. | 296/97.5 X R |
| 4,710,856 | 12/1987 | Cheung | 362/74 |
| 4,751,618 | 6/1988 | Iacovelli | 362/74 |

Primary Examiner—Stephen F. Husar
Attorney, Agent, or Firm—Brooks & Kushman

[57] ABSTRACT

An electrical circuit assembly mechanism for an illuminated vehicle visor having a mirror and a slidable panel for covering and uncovering the mirror. Movement of the slidable panel from the covered position to the uncovered position closes the circuit. Movement of the slidable panel from the uncovered position to the covered position opens the circuit. An electrically conductive member cooperates with the slidable panel and an electrically conductive support member to activate and deactivate the illumination of the mirror on the visor. Movement of the slidable panel results in corresponding movement of the conductive member, which, in turn, results in contact being made or broken between the support member and a ground bar, depending on the position of the slidable panel relative to the mirror.

22 Claims, 7 Drawing Sheets

CIRCUIT ASSEMBLY FOR ILLUMINATED VISOR

TECHNICAL FIELD

This invention relates to visors, and in particular, to mechanisms for activating lights for a visor mirror using a slidable covering panel.

BACKGROUND ART

Many visors employed in automobiles have lighted vanity mirrors. Such vanity mirrors are conventionally located on the side of the visor facing the occupant when the visor is in the lowered position. The use of a sliding panel to activate the lights associated with such a vanity mirror is also well known in the art.

Typically, such devices have required complicated switches and electrical componentry. For example, U.S. Pat. No. 4,648,011 to Boote et al discloses an illuminated vanity mirror package for a visor which includes a cam operated switch to close a circuit for illuminating lights about the mirror when the cover is moved from a closed to an open position. In such a configuration, additional conductors are required between the electrical contacts and the lamps.

U.S. Pat. No. 4,791,537 to Fisher et al discloses another visor having an illuminated mirror which uses a conventional trip switch mounted about the mirror to close the electrical circuit for the lights when the vanity door is moved from its closed position to its open position. This configuration requires the use of additional components in order to effectively function.

U.S. Pat. No. 4,922,391 to Dykstra discloses a vanity mirror package for a visor which provides a light contained within the handle for illuminating the mirror. In this configuration, the light is illuminated the moment the panel is moved toward the open position, the light remaining illuminated until the panel is in the closed position.

The present invention incorporates all of the known benefits of sliding-door type vanity mirrors while improving the switch mechanism.

SUMMARY OF THE INVENTION

The present invention is a switch circuit assembly for an illuminated visor mirror. The uncovering of the mirror by movement of the panel from a closed position to an open position closes an electrical circuit which illuminates the lights about the mirror. Movement of the panel from the open position to the closed position opens the circuit to automatically turn off the lights.

Accordingly, an object of the present invention is to provide an inexpensive circuit assembly for illuminating a visor mirror based on slidable movement of a panel.

Another object of the invention is to provide an improved circuit assembly for illuminating a visor by simplifying the switch thereof.

A specific object of the present invention is to provide an improved circuit assembly for illuminating a visor mirror. In combination with a stowable vehicle visor having a mirror, a lamp adjacent the mirror, a panel slidably movable with respect to the mirror for covering and uncovering the mirror, and an electrical circuit assembly for selectively illuminating the lamp in response to the slidable movement of the panel. The circuit assembly has an electrically conductive support for the lamp adapted for electrical connection to the power supply of the vehicle. An electrically conductive member is situated between the support and the panel, which is movable by the panel and including a lost motion means cooperating with the panel so that the panel has limited movement without moving the member when the panel is moved for covering and uncovering the mirror. The conductive member is movable into direct electrical contact with the support when the panel is moved for uncovering the mirror. The ground bar means is adapted for electrical connection to the vehicle ground and cooperates with the conductive member to complete the electrical circuit for the lamp when the panel is moved.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
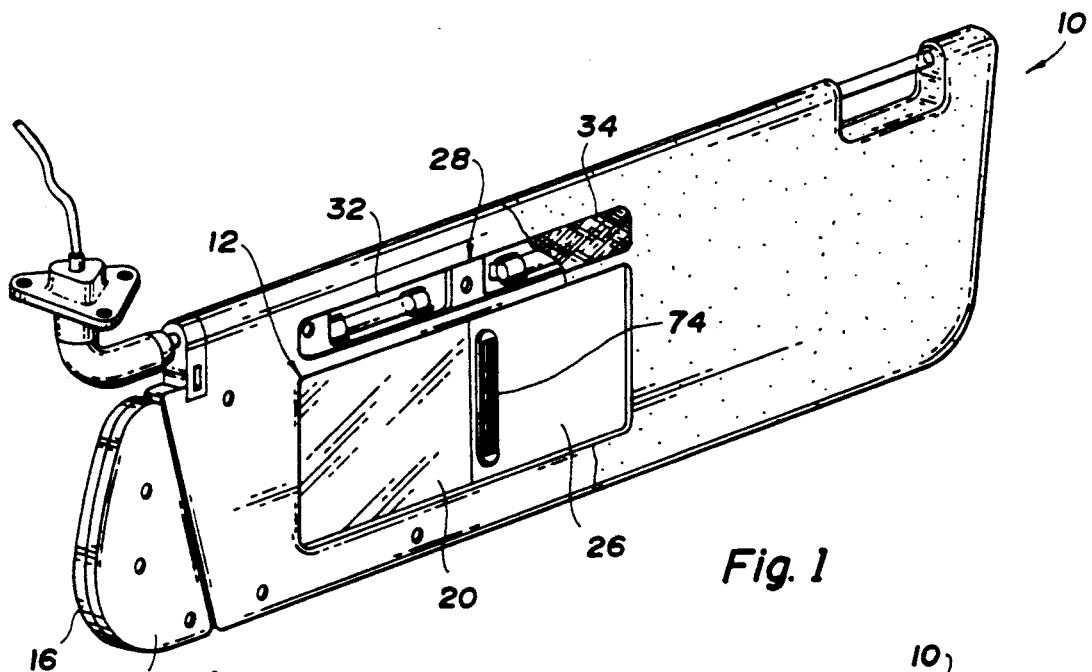
FIG. 1 is a perspective view of a visor having an illuminated vanity mirror in accordance with the present invention.
Figure 2:
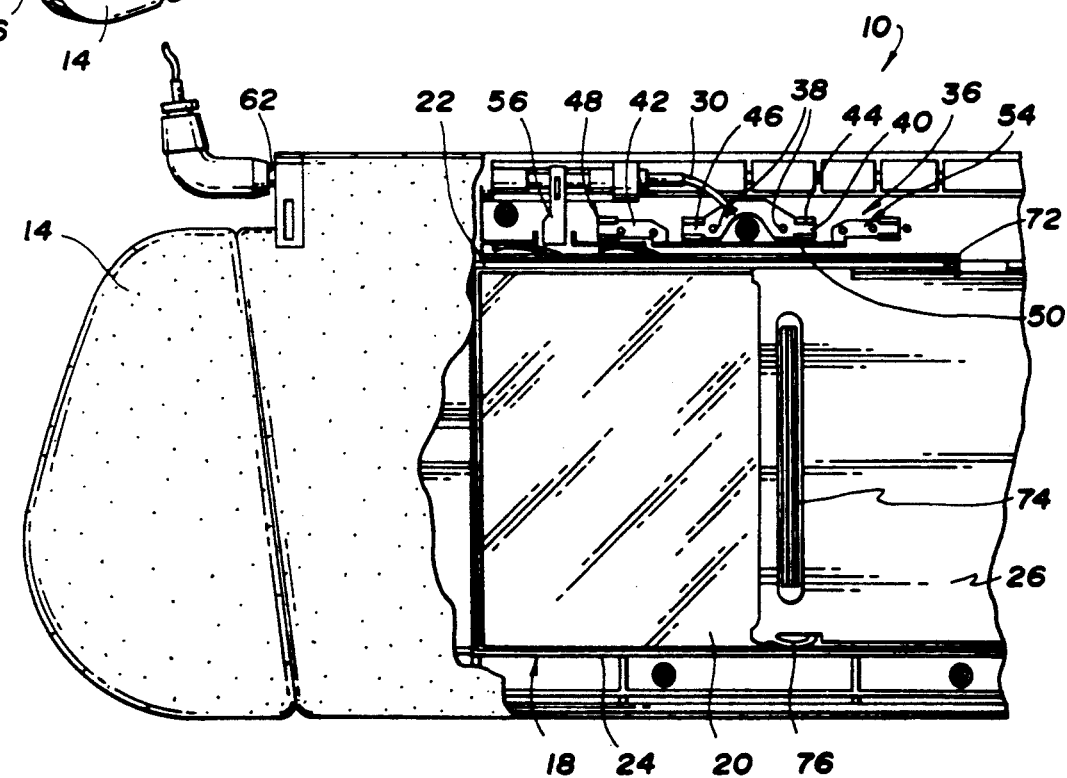
FIG. 2 is a frontal view of the device shown in FIG. 1, partially broken away showing the internal elements of the present invention.
Figure 3:
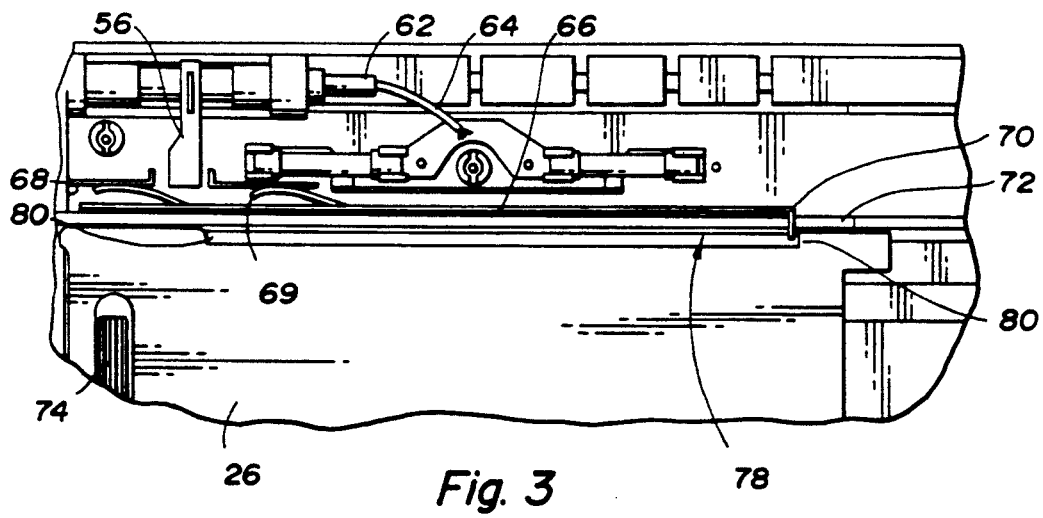
FIG. 3 is a frontal view similar to that shown in FIG. 2, showing internal elements of the device when the panel is in the closed position.

Referring to FIGS. 1 through 10, FIG. 1 illustrates a visor, generally indicated at 10, including a illuminated mirror assembly generally indicated at 12, and the visor 10 is constructed of a front half 14 and a rear half 16.

The mirror assembly 12 includes a mirror mount 18 integrally formed within the rear half 16 into which a mirror 20 is seated. The mirror 20 is retained within the rear half 16 by adhesive or mechanical means. The mirror mount 18 has an upper guide 22 and a lower guide 24 between which a panel 26 is slidably retained over the mirror 20 interposedly between the front half 14 and the rear half 16. The upper guide 22 and the lower guide 24 control movement of the panel 26 as the panel 26 moves relative to the mirror 20 so as to cover or uncover the mirror 20.

The mirror assembly 12 also has a light assembly 28 which includes an electrical circuit assembly 30 for operating a series of lamps 32 and 34 respectively. The electrical circuit assembly 30 has a support assembly 36 constructed of electrically conductive materials which are fastened to the inner surface of the rear half 16 by plastic mounting studs 38 which are heat melted to secure the support assembly 36.

The support assembly 36 is formed by a first housing 40 and a second housing 42. The first housing 40 and the second housing 42 are configured so as to cooperate in housing two fuse-type lamps 32 and 34. The first housing 40 is generally an inverted U-shape having two cup-shaped holders 44 located at the free end of two flanges 46 where one flange 46 extends laterally from each side of the open end of the U-shaped first housing 40. The second housing 42 has two cup-shaped holders 48, such that each cup-shaped holder 48 is located lateral to and in longitudinal alignment with the cup-shaped holders 44 of the first housing 40. A bus bar 50 interposedly connects the two cup-shaped holders 48 and is in parallel alignment with the flanges 46. The first housing 40 is located in longitudinal alignment with and interposed between the two cup-shaped holders 48 and slightly above the bus bar 50. The first housing 40 and the second housing 42 cooperate to form a first seat 52 and a second seat 54. Each lamp 32,34 is press-fitted into either the first seat 52 or the second seat 54. The first seat 52 is formed by the one holder 48 from the second housing 42 and one holder 44 from the first housing 40. The second seat 54 is formed from a holder 44 from the first housing 40 and a holder 48 from the second housing 42.

A ground bar 56 is located above the mirror 20 and lateral to the first seat 52. The ground bar 56 has a generally rectangular shape and has an L-shaped foot 58 which cooperates with a slot 60 to secure the ground bar 56 to the rear half 16 of the visor 10. Securing the foot 58 pre-stresses the opposite end of the ground bar 56 against an electrically conductive pivot shaft 62. The pivot shaft 62 is used to secure the visor 10 to the vehicle. The pivot shaft 62 is hollow enabling a power supply wire 64 connected to the vehicle's power supply to extend from the free end of the pivot shaft 62 and be connected by soldering, welding, or mechanical means to the first housing 40 thereby providing power to the electrical circuit.

In this embodiment, a conductive member 66 is generally rectangular in shape having a first contact member 68 and a second contact member 69. Both the first contact member 68 and the second contact member 69 extend upwardly from the conductive member 66.

The first contact member 68 cooperates with the ground bar 56, while the second contact member 69 cooperates with the bus bar 50 to complete the negative or ground portion of the electrical circuit.

The conductive member 66 has a stop 70 projecting perpendicularly downward from the conductive member 66. The stop 70 projects downward through a space 72 defined by a gap in the upper guide 22 allowing the stop 70 to cooperate with the panel 26 for opening or closing the circuit.

A handle 74 is integrally attached to the panel 26 to assist in moving the panel 26 between the closed position and the open position. Two spring members 76 are integrally formed and protrude downward from the bottom of the panel 26. The spring members 76 contact the lower guide 24 so as to bias the panel 26 upward against the upper guide 22 ensuring solid contact between the panel 26 and the stop 70 of the conductive member 66. A recess 78 is located along the top of the panel 26. A shoulder 80 is located at each opposite end of the recess 78. The stop 70 protruding through the space 72 fits between the shoulders 80 into the recess 78.

In operation, as the panel 26 is moved from the closed position to the open position, the recess 78 slides along beneath the stop 70 until the panel 26 has sufficiently uncovered the mirror 20 such that the shoulder 80 opposite the direction of travel of the panel 26 engages the stop 70 and slides the conductive member 66 in the same direction of travel as the panel 26. The first contact member 68 and the second contact member 69 then come into contact with the ground bar 56 and the bus bar 50 respectively, thereby completing the electrical circuit and illuminating the lamps 32 and 34. As the panel 26 is moved from the open position to the closed position, the recess 78 again slides along beneath the stop 70 until the shoulder 80 opposite the direction of travel of the panel 26 engages the stop 70 and moves the conductive member 66 in the same direction of travel as the panel 26. In so doing, the first contact member 68 and the second contact member 69 disengage from the ground bar 56 and the busbar 50 respectively, thereby opening the circuit and turning off the lamps 32 and 34 as the panel 26 covers the mirror 20.

Figure 7:
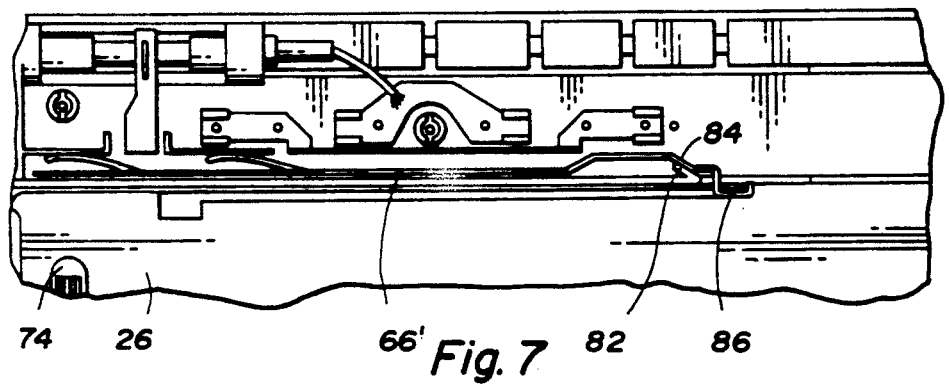
FIG. 7 is a frontal view similar to that shown in FIGS. 2 and 3, partially in section of an alternative embodiment constructed in accordance with the present invention.
Figure 7A:
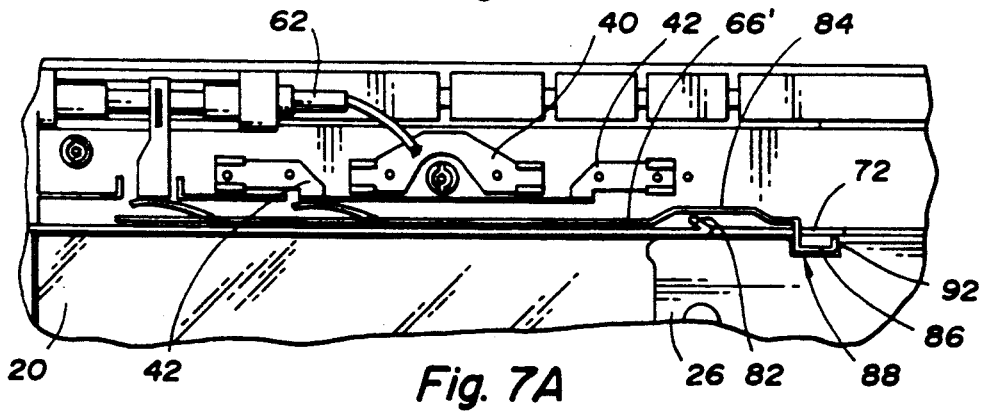
Figure 7B:
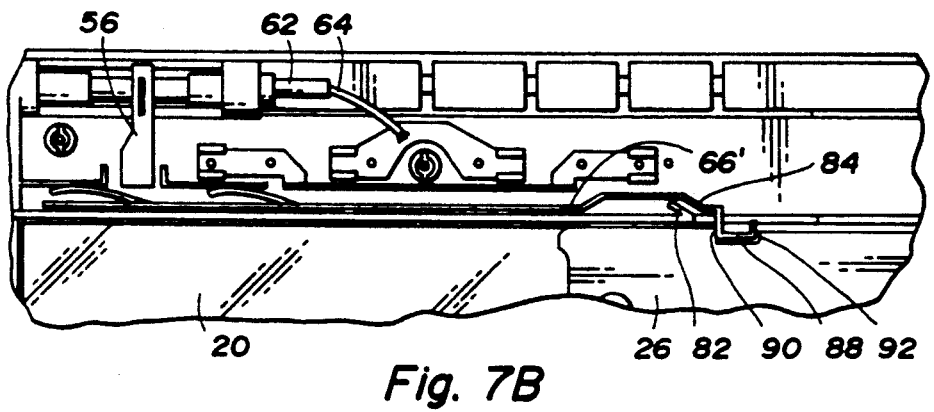
Figure 4:
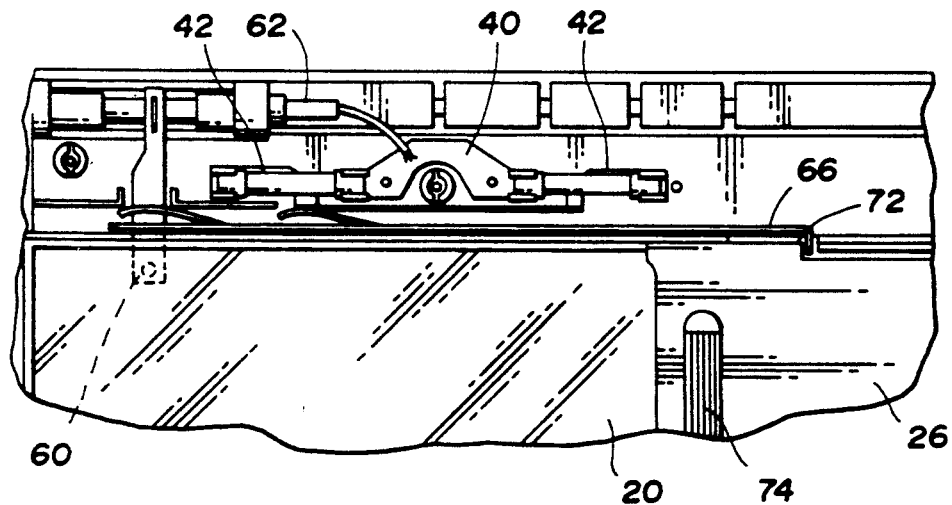
FIG. 4 is a frontal view similar to that shown in FIGS. 2 and 3 showing the internal elements of the device when the panel is in the open position activating the lights.
Figure 5:
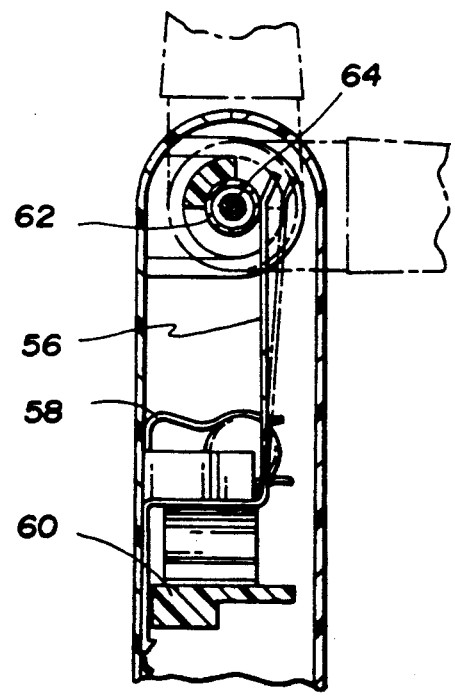
FIG. 5 is an end view of the device in cross-section showing the interrupt mechanism.
Figure 6A:
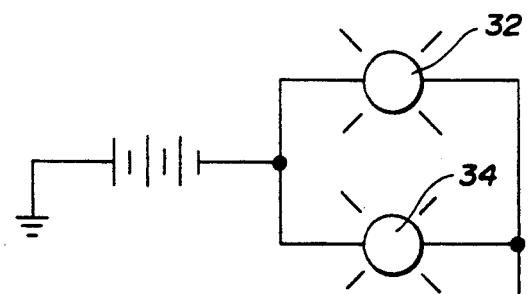
FIG. 6A is a schematic representation of the present invention.
Figure 6B:
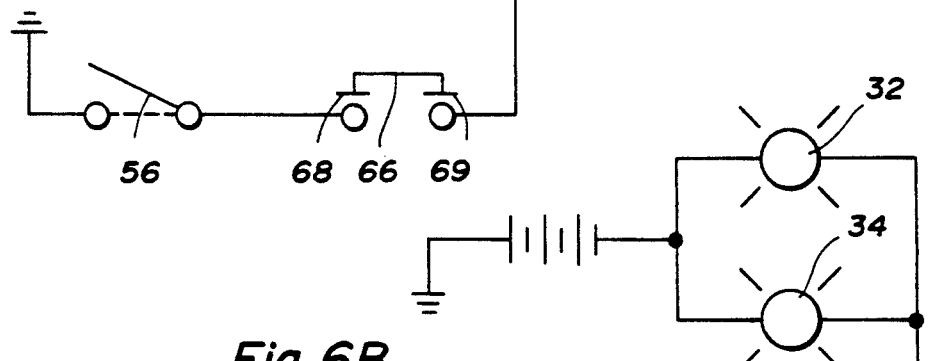
FIG. 6B is a schematic representation of an alternative embodiment of the present invention.
Figure 6C:
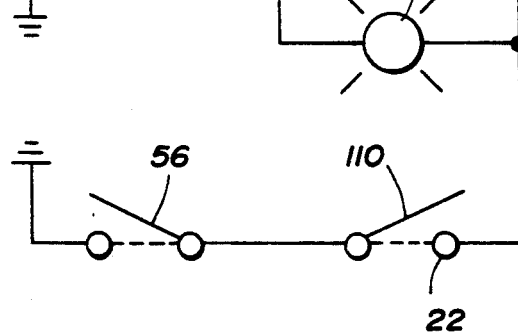
FIG. 6C is a schematic representation similar to that shown in FIG. 6A having reverse polarity.
Figure 6C:
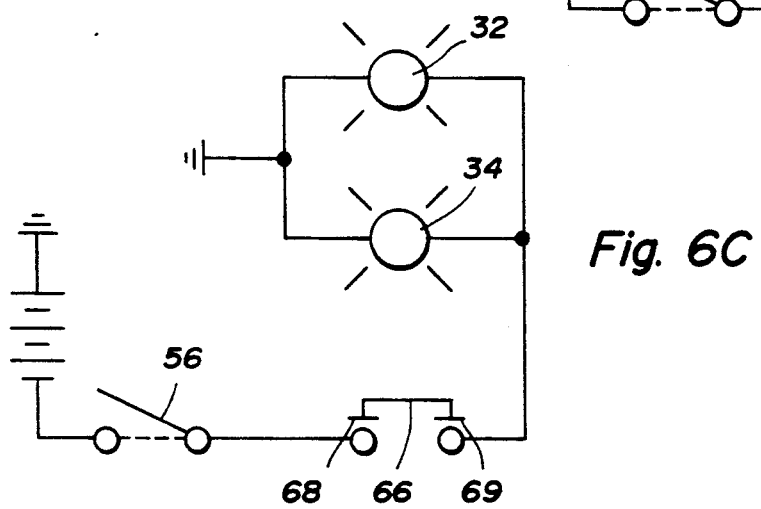
Figure 6D:
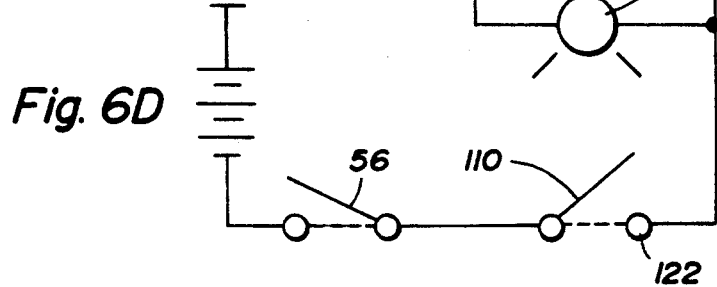
FIG. 6D is a schematic representation similar to that FIG. 6B having reverse polarity.

In FIG. 7, an alternative embodiment of the present invention is shown. All features of the device remain the same as in the embodiment described above except as otherwise noted. In this embodiment, the free end of the upper guide 22 has a ramp 82 projecting upward from the panel 26 toward the conductive member 66'. To accommodate and cooperate with the ramp 82 the body of the conductive member 66' contains a bridge portion 84 toward the stop 70. The stop 70 has a glide portion 86 integrally formed to the end of the stop 70 perpendicular to the stop 70 and parallel to the recess 78. A notch 88 is formed in the recess 78 of the panel 26 to cooperate with the glide portion 86 of the conductive member 66' for opening and closing the electrical circuit.

In operation, the glide portion 86 glides along the recess 78 as the panel 26 moves toward the open position. As the panel 26 continues to move, the glide portion 86 enters into the notch 88. The glide portion 86 glides along the notch 88 until the stop 70 above the glide portion 86 contacts a high shoulder 90 located at one end of the notch 88. The high shoulder 90 then moves the stop 70 and the conductive member 66' in the same direction of travel as the panel 26, thereby closing the electrical circuit. As the panel moves toward the closed position, the glide portion 86 glides along the notch 88 until contacting a low shoulder 92, located at the opposite end of the notch 88 from the high shoulder 90. The low shoulder 92 then moves the conductive member 66' in the same direction as the panel 26 until the electrical circuit is open. At this point, the ramp 82 cooperating with the bridge portion 84 of the conductive member 66' causes the stop 70 and the glide portion 86 to lift so as to glide over the low shoulder 92 and travel along the recess 78 as the panel 26 continues toward the closed position.

Figure 8:
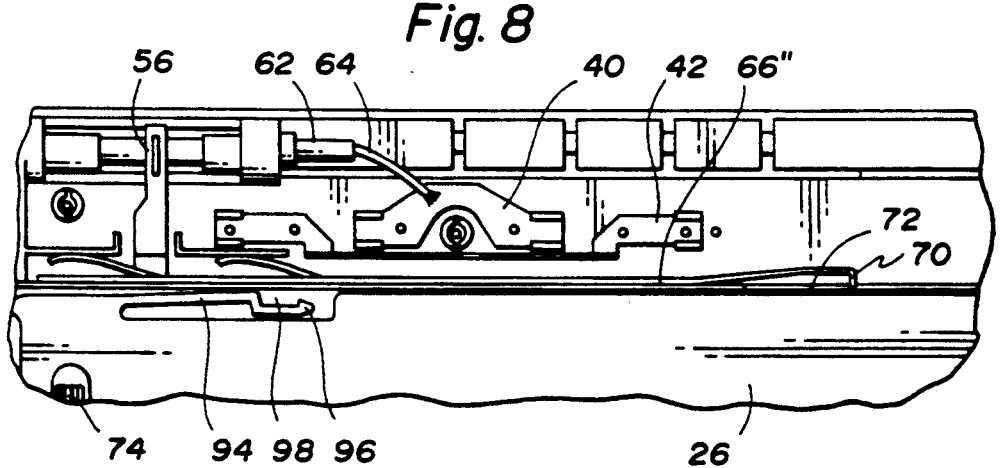
FIG. 8 is a frontal view similar to that shown in FIGS. 2 and 3, partially in section of an alternative embodiment constructed in accordance with the present invention.
Figure 8A:
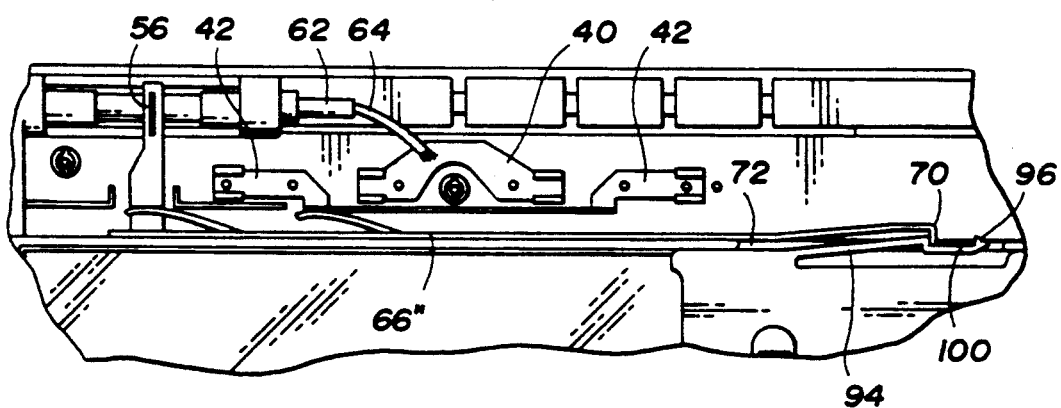
Figure 8B:
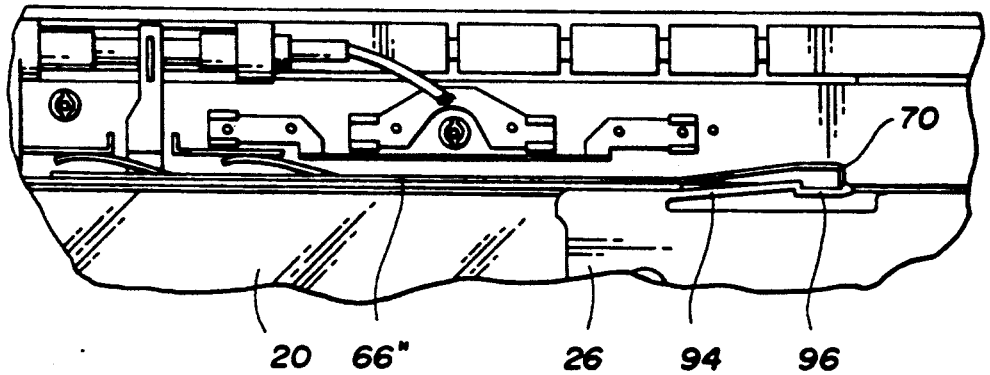

FIG. 8 shows an alternative embodiment of the present invention. In this embodiment, rather than a recess 78, a catch finger 94 is located along the top of the panel 26. The catch finger 94 is integrally formed with the panel 26 and has a free end 96 which extends upward away from the panel 26. At the free end 96, there is a recess 98 having shoulders 100 located at each opposite end of the recess 98. When the panel 26 is in the closed position, the catch finger 94 is pressed downward against the panel 26. As the panel 26 moves toward the open position, the catch finger 94 as it reaches the space 72 in the upper guide 22 moves upward away from the panel 26 and engages the stop 70 in the recess 98. The recess 98 slides along under the stop 70 until the stop 70 contacts the shoulder 100. At this point, the stop 70 and the conductive member 66" travel in the same direction as the panel 26, causing the first contact member 68 and the second contact member 69 to make contact with the ground bar 56 and the bus bar 50 respectively, thereby closing the electrical circuit. During closing of the panel 26, the other shoulder 100 of the recess 98 carries the conductive member 66" along in the direction of travel of the panel 26 until the electrical circuit is open. Then, the free end 96 of the upper guide 22 cams the catch finger 94 downward toward the panel 26 causing the catch finger 94 to disengage the stop 70.

Figure 9:
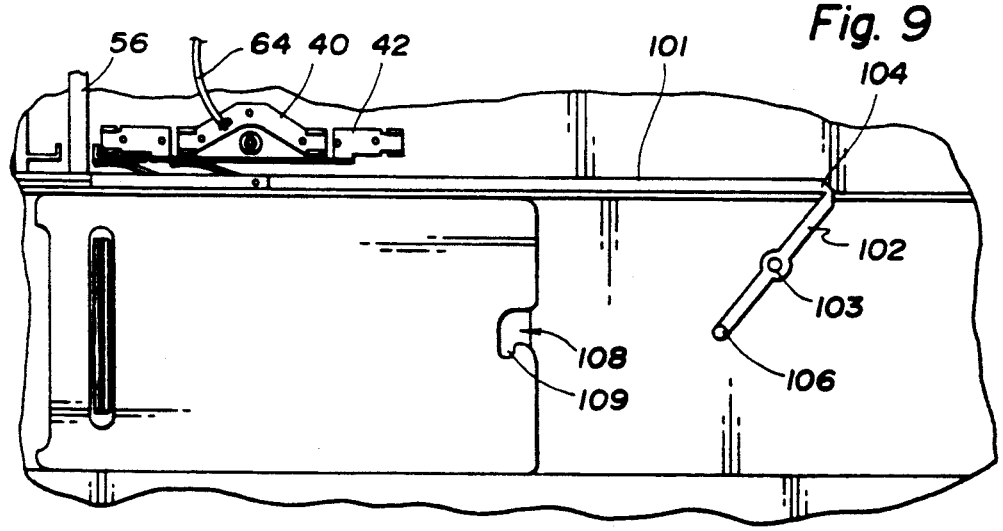
FIG. 9 is a frontal view similar to that shown in FIGS. 2 and 3, partially in section of an alternative embodiment constructed in accordance with the present invention.
Figure 9A:
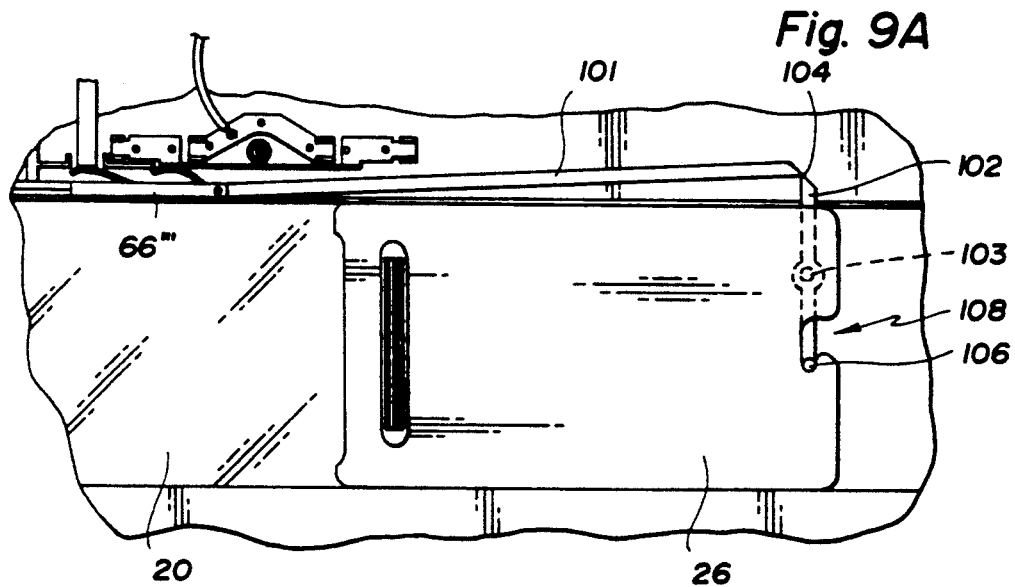
Figure 9B:
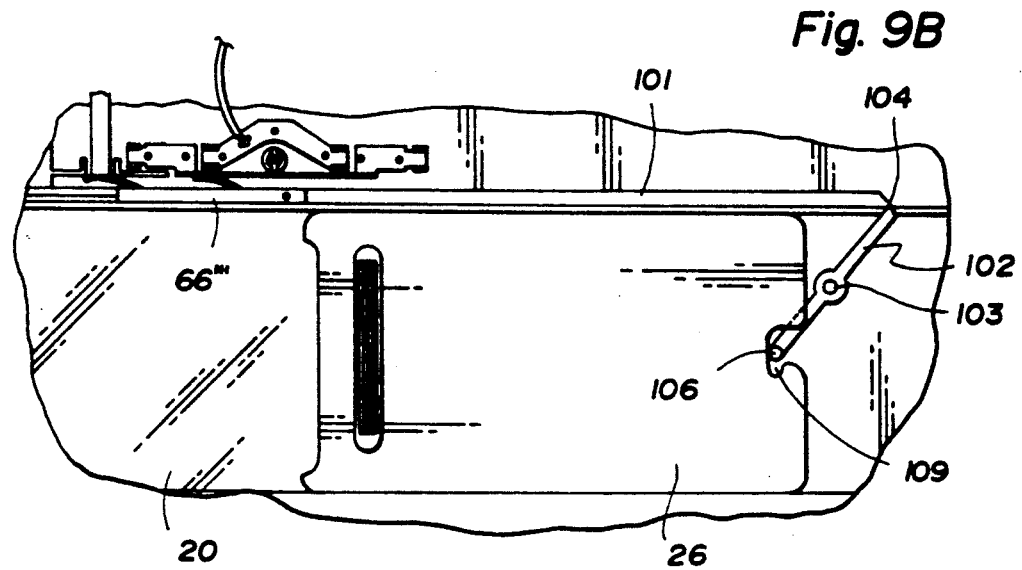

In FIG. 9, an alternative embodiment is shown. In this embodiment, the conductive member 66''', incorporating first contact member 68 and second contact member 69 is hingedly connected to a link 101 which is, in turn, hingedly connected to a pivot arm 102. The pivot arm 102 pivots about a fulcrum pin 104 which is fixed to the rear half 16 of the visor 10. Affixed to the end of the pivot arm 102 is an engagement pin 106 which engages a recess 108 located in the leading edge of the panel 26. The recess 108 is an inverted L-shape with a proportionately larger mouth to allow easy entrance and exit of the engagement pin 106 and having a smaller leg 109. The pivot arm 102 extends downward from the link 101 toward the panel 26 when closed, forming an angle of approximately 45 degrees with the link 101. When the panel 26 is moved toward the open position, the engagement pin 106 enters the recess 108. Once seated in the recess 108, the engagement pin 106 is pushed in the same direction as the panel 26 causing the pivot arm 102 to pivot about the fulcrum pin 104 forcing both the link 101 and the conductive member 66''' to travel in the opposite direction from the panel 26 thereby completing the electrical circuit. This pivoting of the pivot arm 102 also forces the engagement pin 106 to move downward into the leg 109 of the recess 108. As the panel begins to close, the engagement pin 106 is initially trapped within the leg 109 of the recess 108 and pulled in the same direction as the panel 26, causing the conductive member 66''' to move in the opposite direction from the panel 26, thereby opening the electric circuit. As the panel 26 continues closing, the engagement pin 106 moves up out of the leg 109 of the recess 108 thereby decoupling the pivot arm 102 from the panel 26, allowing the panel 26 to continue closing without any further movement of the conductive member 66'''.

Figure 10:
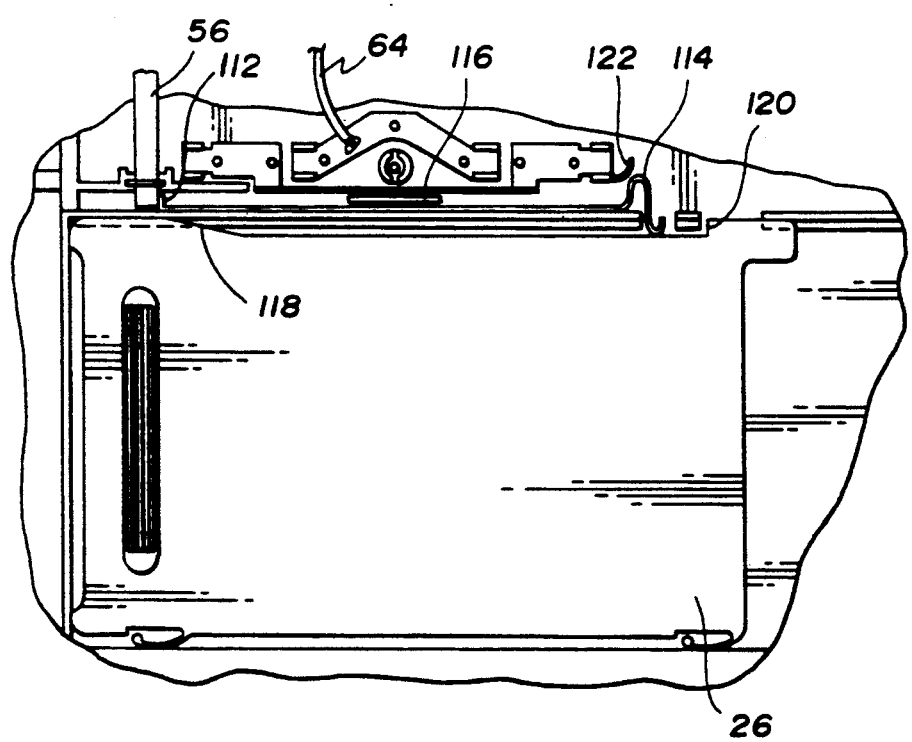
FIG. 10 is a frontal view similar to that shown in FIGS. 2 and 3, partially in section of an alternative embodiment constructed in accordance with the present invention
Figure 10A:
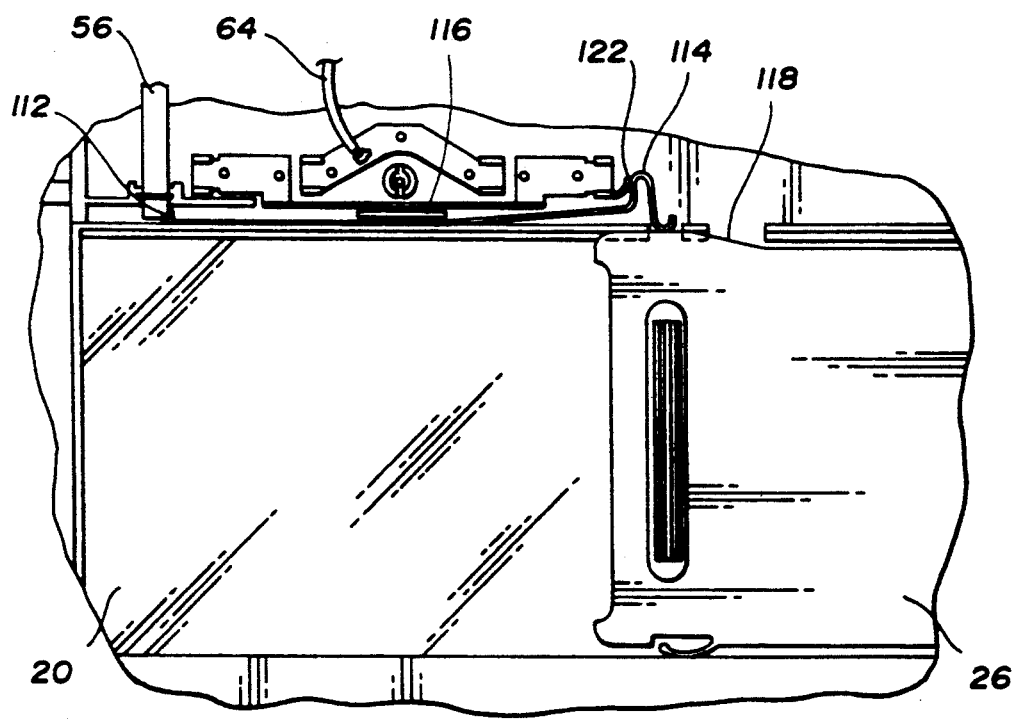

FIG. 10 illustrates another embodiment of the present invention. In this embodiment, the conductive member 66 does not travel in the same direction as the panel 26, rather the conductive member 110 moves upward or downward in response to movement of the panel 26. Specifically, a flexible conductive member 110 has a fixed end 112 attached to the ground bar 56 and an S-shaped hook 114 located at its free end. Interposed between the fixed end 112 and the hook 114 and interposed between the conductive member 110 and the bus bar 50, is a fulcrum block 116, about which the conductive member 110 bends in response to upward pressure exerted on the hook 114 by the panel 26. A ramp 118 is located at one end of the recess 78, opposite a shoulder 120. A flexible contact member 122 extends laterally from the second housing 42 above the hook 114. As the panel 26 moves to the open position, the hook 114 slides along the recess 78, eventually moving up the ramp 118 toward the end of the recess 78. As the hook 114 moves along the ramp 118, the hook 114 is forced upward causing the conductive member 110 to bend against the fulcrum block 116. The conductive member 110 continues to bend contacting the contact member 122 and completing the electrical circuit. When closing the mirror 20, the panel 26 moves in the opposite direction resulting in the hook 114 traveling down the ramp 118. As the hook 114 travels down the ramp 118, the conductive member 110 disengages the contact member 122, thereby opening the electrical circuit.

The foregoing embodiments include ground bars for disabling the power circuits for the lamps when the visor is stowed. The invention here taught may also be utilized in a circuit assembly where the polarity is reversed and the circuit energized through a contact with a wire from the vehicle power supply instead of the ground, such as exemplified in the schematic wiring diagrams of FIG. 6C and 6D.

While the best modes for carrying out the invention has been described in detail, those familiar with the art to which this invention relates will recognize various alternative designs and embodiments for practicing the invention as defined by the following claims.

What is claimed is:

1. In combination with a vehicle visor having a mirror, a lamp positioned so as to illuminate objects located in front of the mirror, a panel slidably movable with respect to the mirror for covering and uncovering the mirror and an electrical circuit assembly for selectively illuminating the lamp in response to the slidable movement of the panel, the circuit assembly comprising:

an electrically conductive support for the lamp adapted for electrical connection in a power supply circuit of the vehicle;

an electrically conductive member between the support and the panel and moveable by the panel and including lost motion means in cooperation with the panel so that the panel has limited movement without moving the member when the panel is moved for covering and uncovering the mirror;

the conductive member being movable into direct electrical contact with the support when the panel is moved for uncovering the mirror; and means adapted for electrical connection in the power supply circuit and cooperating with the conductive member to complete the power supply circuit for the lamp in accordance with the movement of the panel.

2. The circuit assembly of claim 1 wherein the visor includes a mirror mount portion having an upper guide and a lower guide and the panel is movable in to and fro directions guided by the upper guide and lower guide.

3. The circuit assembly of claim 1 wherein the lost motion means includes the panel having a recess located along an upper surface of the panel, the recess having a shoulder located at each opposite end of the recess such that movement of the panel does not result in movement of the member until the shoulder at an end opposite the direction of travel of the panel engages the member.

4. The circuit assembly of claim 3 wherein the member further includes an end piece smaller than the recess extending into engagement with the shoulders of the recess.

5. The circuit assembly of claim 2 wherein the panel further includes a plurality of integrally connected spring members along a lower surface of the panel pressing against the lower guide to bias the panel upward against the upper guide ensuring solid contact with the member during movement of the panel between an open position and a closed position.

6. The circuit assembly of claim 1 wherein the means adapted for electrical connection includes a ground bar, and the conductive member includes a first contact and a second contact extending upwardly from the member so as to make electrical contact with the ground bar and the support respectively.

7. The circuit assembly of claim 1 wherein the means adapted for electrical connection includes a ground bar, and the conductive member further includes a first contact and a second contact extending upward from the member to make electrical contact with both the support and the ground bar respectively when the panel is moved for uncovering the mirror and to break electrical contact with the support and the ground bar when the panel is moved for covering the mirror.

8. The circuit assembly of claim 7 wherein the conductive support for the lamp includes an electrically connected first lamp housing and a second lamp housing for press-fitting a plurality of fuse-type lamps;
   each of the first and second lamp housings having a plurality of lamp holders connected respectively by a conductive strip;
   the conductive member including a bus bar located below the first lamp housing and the second lamp housing in parallel alignment therewith and having a first contact in selective engagement with one of the lamp housings and a second contact in selective engagement with the ground bar such that the conductive member engages the ground bar and one of the lamp housings when the panel is moved for uncovering the mirror to complete the power supply circuit, thereby illuminating the lamps.

9. The combination of claim 1 including a pivot shaft for mounting and stowing the visor and providing the electrical connection to the power supply circuit of the vehicle, the pivot shaft having one portion providing the connection for the ground bar and another portion providing the electrical connection for the support.

10. The circuit assembly of claim 1 wherein the ground bar further operates to interrupt the power supply circuit when the visor is stowed.

11. The circuit assembly of claims 2 or 5 wherein the lost motion means comprising the panel having a catch finger located along an upper surface of the panel, the catch finger having a free end extending upward away from the panel and having a recess portion along the free end of the catch finger;
   the recess portion having a shoulder located at each opposite end thereof;
   the upper guide defining a space enabling the catch finger to engage the member when the panel travels toward an open position, whereby to close the power supply circuit;
   the catch finger remaining engaged with the member as the panel travels a limited distance toward the closed position, whereby to open the electrical circuit;
   the catch finger is cammed downward by the upper guide away from the member, whereby to disengage the panel from the member as the panel continues movement toward the closed position.

12. The circuit assembly of claims 2 or 5 wherein the lost motion means comprising the panel having a shoulder located at each opposite end along an upper surface of the panel;
   a recess located along the upper surface of the panel cooperating with the conductive member such that movement of the panel does not result in movement of the conductive member until the conductive member engages either the shoulder or an end wall of the recess opposite the direction of travel of the panel;
   the upper guide defining a space enabling the conductive member to cooperate with the panel;
   the conductive member including an end piece smaller than the recess and cooperating with the recess; and
   the conductive member cooperating with the panel such that movement of the panel slides the conductive member in the direction of travel of the panel to either open or close the electrical circuit.

13. The circuit assembly of claim 12 wherein the upper guide incorporating a ramp means located at one end of the space; and
   the ramp means cooperating with the conductive member such that movement of the conductive member in one direction results in the end piece of the conductive member moving downward to engage the recess of the panel and movement of the conductive member in an opposite direction results in the end piece of the conductive member moving upward away from the recess, thereby disengaging the conductive member from further movement of the panel in that direction.

14. The circuit assembly of claims 1, 2 or 5 wherein the lost motion means comprising a pivot arm having one end for moving the member and for opening or closing the power supply circuit when the pivot arm and another end cooperate with a recess in the panel to pivot the pivot arm, the pivot arm having an engagement pin engaging the recess as the panel moves toward an open position, thereby closing the power supply circuit, the engagement pin remaining engaged in the recess when the panel is initially moved toward the closed position, thereby opening the power supply circuit.

15. The circuit assembly of claim 14 wherein the recess is configured to allow the engagement pin limited travel within the recess in response to movement of the panel after which the engagement pin disengages the recess, thereby decoupling the panel from the member.

16. In combination with a stowable vehicle visor having a mirror, a lamp positioned so as to illuminate objects located in front of the mirror, a panel slidably movable for covering and uncovering the mirror and an electrical circuit assembly for selectively illuminating the lamp in response to the slidable movement of the panel, the circuit assembly comprising:

an electrically conductive support for the lamp adapted for electrical connection in a power supply circuit of the vehicle;

an electrically conductive member between the support and the panel and movable by the panel;

the conductive member in response to slidable movement of the panel enabling completion of the power supply circuit for the lamp only after the panel has substantially uncovered the mirror; and a means adapted for electrical connection in the power supply circuit and cooperating with the conductive member to complete the power supply circuit for the lamp when the panel is moved for uncovering the mirror and operating as an override means for interrupting the power supply circuit when the visor is in a stowed position regardless of the movement of the panel.

17. The circuit assembly of claim 16 wherein the panel is moveable along a horizontal direction of travel controlled by an upper guide and a lower guide.

18. The circuit assembly of claim 16 wherein the panel includes a ramp located on an upper surface of the panel engaging and flexing the conductive member to complete the power supply circuit as the panel moves for uncovering the mirror.

19. The circuit assembly of claim 18 wherein the conductive member is flexible and further including a free end having a hook extending downward to engage the ramp.

20. In combination with a stowable vehicle visor having a mirror, a lamp positioned so as to illuminate objects located in front of the mirror, a panel slidably movable for covering and uncovering the mirror and an electrical circuit assembly for selectively illuminating the lamp in response to the slidable movement of the panel, the circuit assembly comprising:

an electrically conductive support for the lamp adapted for electrical connection in a power supply circuit of the vehicle;

an electrically conductive member between the support and the panel and movable by the panel;

the conductive member in response to slidable movement of the panel enabling completion of the power supply circuit for the lamp only after a limited movement of the panel;

a means adapted for electrical connection in the power supply circuit and cooperating with the conductive member to complete the power supply circuit for the lamp when the panel is moved for uncovering the mirror and operating as an override means for interrupting the power supply circuit when the visor is in a stowed position regardless of the movement of the panel; and wherein the panel is moveable along a horizontal direction of travel controlled by an upper guide and a lower guide; and wherein the panel further including a plurality of integrally connected spring members along a lower surface of the panel pressing against the lower guide to bias the panel upward against the upper guide ensuring solid contact with the conductive member during movement of the panel.

21. In combination with a stowable vehicle visor having a mirror, a lamp positioned so as to illuminate objects located in front of the mirror, a panel slidably movable for covering and uncovering the mirror and an electrical circuit assembly for selectively illuminating the lamp in response to the slidable movement of the panel, the circuit assembly comprising:

an electrically conductive support for the lamp adapted for electrical connection in a power supply circuit of the vehicle;

an electrically conductive member between the support and the panel and movable by the panel;

the conductive member in response to slidable movement of the panel enabling completion of the power supply circuit for the lamp only after a limited movement of the panel;

a means adapted for electrical connection in the power supply circuit and cooperating with the conductive member to complete the power supply circuit for the lamp when the panel is moved for uncovering the mirror and operating as an override means for interrupting the power supply circuit when the visor is in a stowed position regardless of the movement of the panel;

the panel includes a ramp located on an upper surface of the panel engaging and flexing the conductive member to complete the power supply circuit as the panel moves for uncovering the mirror;

the conductive member is flexible and further includes a free end having a hook extending downward to engage the ramp;

wherein the support for the lamp includes a first lamp housing and a second lamp housing for press-fitting a plurality of fuse-type lamps, each housing having a plurality of free ends, each formed to hold one end of a fuse-type lamp;

the first housing having an area adapted for the electrical connection to the power supply circuit; and a conductive contact located on the second housing such that the conductive member engages the conductive contact when the hook is forced flexibly upward by the ramp as the panel is moved for uncovering the mirror to complete the power supply circuit, thereby illuminating the lamp.

22. The combination of claim 16 wherein the means adapted for electrical connection in the power supply circuit includes a ground bar and including a pivot shaft for mounting and stowing the visor and providing the electrical connection to the power supply circuit, the pivot shaft having one portion providing the connection for the ground bar and another portion providing the electrical connection to the support.

* * * * *